(12) United States Patent
Yang et al.

(10) Patent No.: US 11,228,069 B2
(45) Date of Patent: Jan. 18, 2022

(54) BATTERY PACK

(71) Applicant: VEHICLE ENERGY JAPAN INC., Hitachinaka (JP)

(72) Inventors: Hanzhi Yang, Hitachinaka (JP); Takayuki Nakajima, Hitachinaka (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 24 days.

(21) Appl. No.: 16/626,390

(22) PCT Filed: Jun. 19, 2018

(86) PCT No.: PCT/JP2018/023177
§ 371 (c)(1),
(2) Date: Dec. 24, 2019

(87) PCT Pub. No.: WO2019/017131
PCT Pub. Date: Jan. 24, 2019

(65) Prior Publication Data
US 2020/0144571 A1    May 7, 2020

(30) Foreign Application Priority Data

Jul. 20, 2017   (JP) .............................. JP2017-140655

(51) Int. Cl.
*H01M 50/20* (2021.01)
*H01M 50/581* (2021.01)
(52) U.S. Cl.
CPC ......... *H01M 50/20* (2021.01); *H01M 50/581* (2021.01); *H01M 2200/103* (2013.01)

(58) Field of Classification Search
None
See application file for complete search history.

(56) References Cited

U.S. PATENT DOCUMENTS

2014/0141309 A1    5/2014  Suzuki
2014/0353057 A1*  12/2014  Adachi ................ E02F 9/0858
                                                             180/68.5
(Continued)

FOREIGN PATENT DOCUMENTS

CN    104868198 A    8/2015
CN    105280851 A    1/2016
(Continued)

OTHER PUBLICATIONS

Office Action dated Dec. 16, 2020, in Korean application No. 10-2019-7038376.
(Continued)

*Primary Examiner* — Wyatt P McConnell
(74) *Attorney, Agent, or Firm* — Foley & Lardner LLP

(57) ABSTRACT

A battery pack provided with a plurality of battery cells, the battery pack making it possible to achieve higher safety than before during handling work. The battery pack is provided with a battery group in which the plurality of battery cells are stacked, and a housing in which the battery group is accommodated. The housing, with respect to a first direction and a second direction perpendicular to a height direction of the housing and to each other, has a dimension in the first direction which is made smaller than a dimension in the second direction. The battery group is eccentrically located on one side in the first direction in the housing.

15 Claims, 18 Drawing Sheets

(56) References Cited

U.S. PATENT DOCUMENTS

| | | |
|---|---|---|
| 2016/0372736 A1 | 12/2016 | Kim et al. |
| 2017/0005314 A1 | 1/2017 | Miyawaki |
| 2018/0190955 A1 | 7/2018 | Motohashi et al. |

FOREIGN PATENT DOCUMENTS

| | | |
|---|---|---|
| CN | 106328877 A | 1/2017 |
| EP | 3 579 297 A1 | 12/2019 |
| EP | 3 579 298 A1 | 12/2019 |
| EP | 3 748 718 A1 | 12/2020 |
| JP | 2012-084340 A | 4/2012 |
| JP | 2016-85932 A | 5/2016 |
| JP | 2017-010778 A | 1/2017 |
| JP | 2017-59377 A | 3/2017 |
| JP | 2017-120693 A | 7/2017 |
| KR | 2015-0014574 A | 2/2015 |
| WO | WO-2013/011836 A1 | 1/2013 |
| WO | WO-2013/129117 A1 | 9/2013 |
| WO | WO-2014/068880 A1 | 5/2014 |
| WO | WO-2016/208183 A1 | 12/2016 |

OTHER PUBLICATIONS

International Search Report with English translation and Written Opinion issued in corresponding application No. PCT/JP2018/023177 dated Sep. 4, 2018.
Extended European Search Report dated Mar. 29, 2021, in European Application No. 18834453.5.
Office Action dated Apr. 21, 2021, in Japanese Patent Application No. 2019-530939.
Chinese Office Action dated Nov. 29, 2021, in Chinese Application No. 201880042993.5.
Japanese Office Action dated Nov. 16, 2021, in Japanese Application No. 2019-530939.

* cited by examiner

BATTERY PACK

TECHNICAL FIELD

The present invention relates to a battery pack provided with a plurality of battery cells.

BACKGROUND ART

Conventionally, an invention relating to a shovel equipped with a power storage apparatus having power storage modules accommodated in housing is known (see Patent Literature 1 indicated below). The power storage apparatus described in Patent Literature 1 has a generally cuboidal shape with a lid and a lower housing, wherein two power storage modules are mounted on a bottom surface in the lower housing (see the literature, paragraphs 0009-0010, and FIG. 1A and FIG. 1B, for example).

The conventional power storage modules have the configuration in which plate-shaped power storage cells and heat transfer plates are stacked alternately in a thickness direction (y-direction), and the power storage modules each as a whole have a cuboidal shape of which the longer direction corresponds to the stacking direction (y-direction) of the power storage cells (see the literature paragraphs 0020-0022, and FIG. 3A and FIG. 3B, for example). The two cuboidal-shaped power storage modules are disposed side by side in the shorter direction (x-direction) with the longer directions thereof parallel to each other.

Also, a connector box is provided on one side surface of the lower housing perpendicular to the y-direction. The connector box is provided at one end in the longer direction (y-direction) of the two power storage modules so as to straddle the two power storage modules in the shorter direction (x-direction) (see the literature, paragraphs 0009-0019, and FIG. 1A and FIG. 2, for example).

CITATION LIST

Patent Literature

Patent Literature 1: WO 2013/129117 A1

SUMMARY OF INVENTION

Technical Problem

A worker who handles a power storage apparatus having a longer-direction of a large dimension and a shorter-direction of a small dimension, such as the one described in Patent Literature 1, tends to handle the power storage apparatus by holding its ends in the longer direction when attaching, detaching, or carrying the power storage apparatus, for example, because this allows the power storage apparatus to be supported relatively easily.

However, the power storage apparatus described in Patent Literature 1 has the connector box, which is lighter than other members such as the power storage modules, provided at one end in the longer direction. Accordingly, during the work of handling the power storage apparatus, because the center of gravity of the power storage apparatus in the longer direction is deviated toward the side opposite to the connector box, the power storage apparatus may lose balance and become unstable, for example, and the work safety may possibly deteriorate.

The present invention provides a battery pack which is provided with a plurality of battery cells, and with which it is possible to achieve higher safety than before during handling work.

Solution to Problem

A battery pack of the present invention includes a battery group having a plurality of battery cells, and a housing accommodating the battery group. The housing, with respect to a first direction and a second direction perpendicular to a height direction of the housing and to each other, has a dimension in the first direction which is made smaller than a dimension in the second direction. The battery group is eccentrically located on one side in the first direction in the housing.

Advantageous Effects of Invention

In the battery pack of the present invention, the housing has the dimension in the first direction which is made smaller than the dimension in the second direction. Specifically, the first direction is the shorter direction of the housing, and the second direction is the longer direction of the housing. In the housing, the battery group, which has a relatively large weight among the members constituting the battery pack, is eccentrically located on one side in the first direction, i.e., the shorter direction of the housing.

Thus, the center of gravity of the battery pack is eccentrically located on one side in the first direction of the housing. Accordingly, during the work of handling the battery pack, when a worker holds both ends in the second direction of the housing, by holding the housing from the one side thereof in the first direction on which the center of gravity of the battery pack is eccentrically located, the battery pack becomes stable and work safety is improved.

Thus, according to the present invention, it is possible to provide a battery pack which is provided with a plurality of battery cells and with which it is possible to achieve higher safety than before during handling work.

DESCRIPTION OF EMBODIMENTS

In the following, embodiments of the battery pack according to the present invention will be described with reference to the drawings.

First Embodiment

Figure 1:
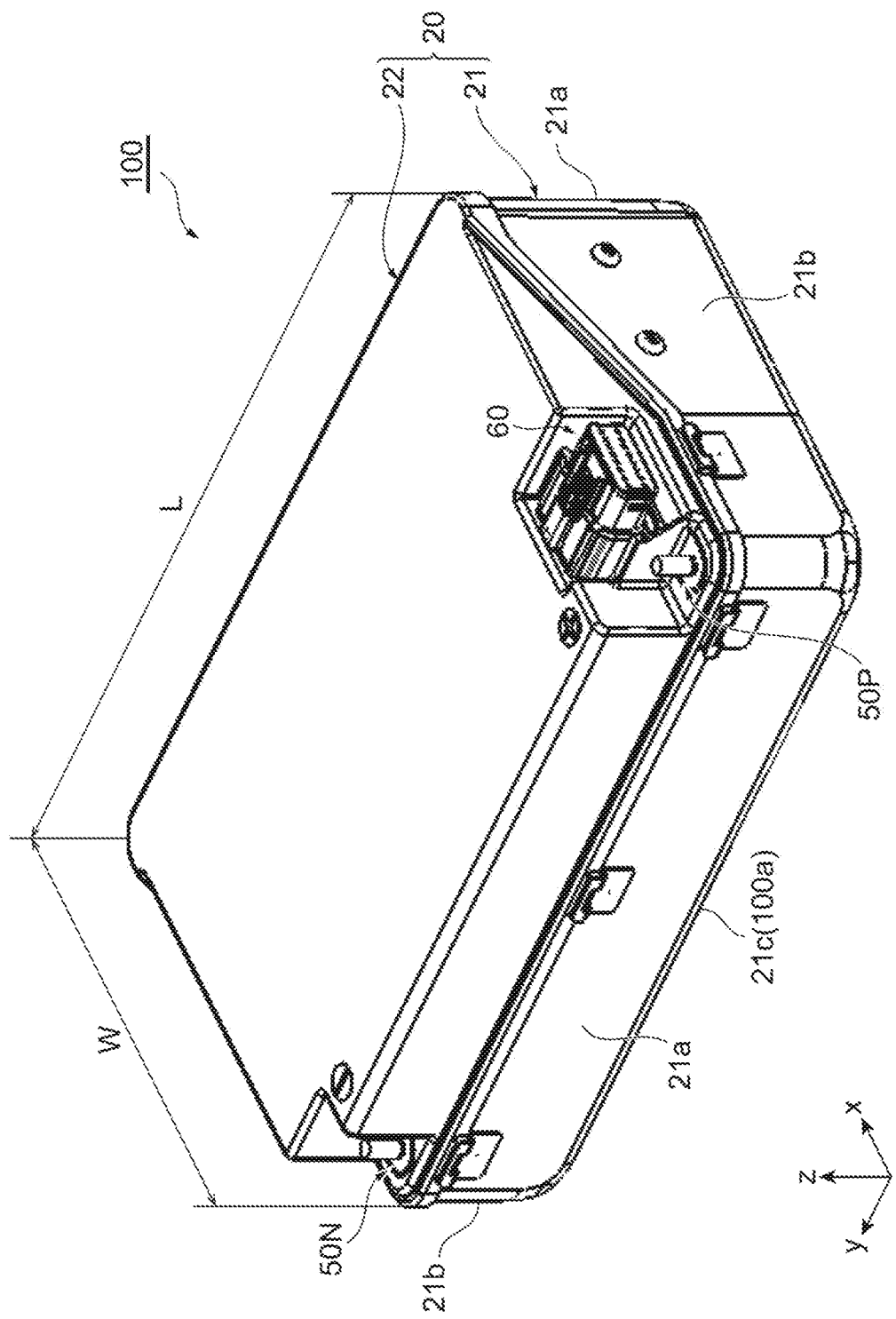
FIG. 1 is a perspective view of a battery pack according to a first embodiment of the present invention.
Figure 2:
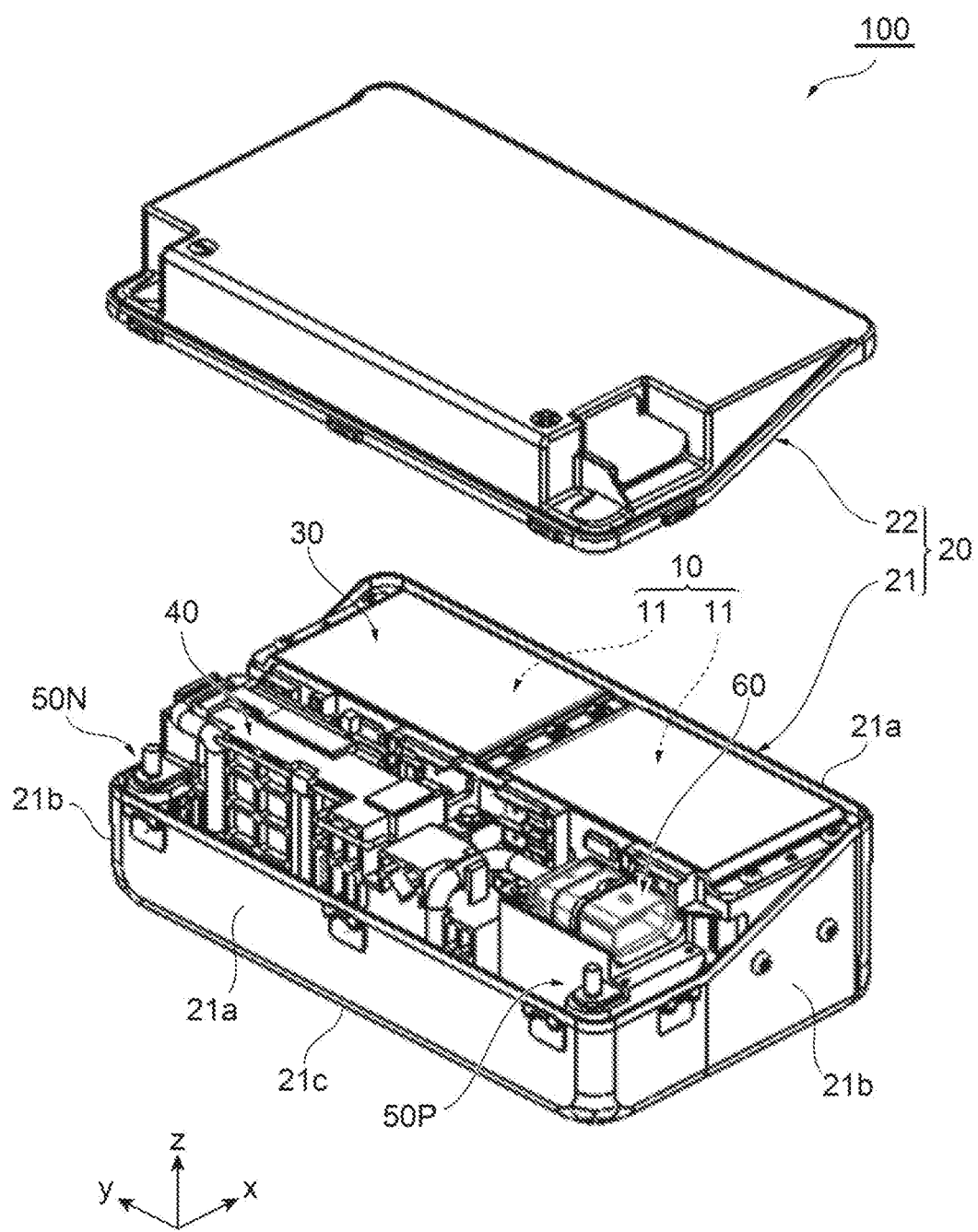
FIG. 2 is an exploded perspective view of the battery pack illustrated in FIG. 1.

FIG. 1 is a perspective view of a battery pack 100 according to a first embodiment of the present invention. FIG. 2 is an exploded perspective view of the battery pack 100 illustrated in FIG. 1. In the following, description may be provided using an orthogonal coordinate system in which the width direction, length direction, and height direction of a housing 20 of the battery pack 100 are respectively referred to as the x-direction, the y-direction, and the z-direction.

The greatest feature of the battery pack 100 of the present embodiment lies in the following configuration. That is, the battery pack 100 of the present embodiment is provided with a battery group 10 (see FIG. 4) in which a plurality of battery cells 1 are stacked, and the housing 20, in which the battery group 10 is accommodated. The housing 20, with reference to a first direction (x-direction) and a second direction (y-direction) which are perpendicular to a height direction (z-direction) of the housing 20 and to each other, has a width W which is the dimension in the first direction and is made smaller than a length L which is the dimension in the second direction. The battery group 10 is eccentrically located on one side in the first direction (x-direction) inside the housing 20. In the following, the configuration of various parts of the battery pack 100 of the present embodiment will be described in greater detail.

The battery pack 100 of the present embodiment is provided with the housing 20, a battery module 30, an electrical component holder 40, module external terminals 50P, 50N, and a connector 60, for example. The housing 20 as a whole has a generally hexahedral, i.e., generally cuboidal, shape, for example. As noted above, the width W of the housing 20, which is the dimension in the first direction (x-direction), is made smaller than the length L, which is the dimension in the second direction (y-direction). That is, in the housing 20, the second direction parallel to the length L direction is the longer direction, and the first direction parallel to the width W direction is the shorter direction.

The housing 20 has sidewalls 21a, 21a and sidewalls 21b, 21b respectively on both ends in the first direction (x-direction) and on both ends in the second direction (y-direction). More specifically, the housing 20 is provided with a bottomed and box-shaped lower case 21 with an open top, and an upper cover 22 closing the top of the lower case 21. The lower case 21 includes the sidewalls 21a, 21a and sidewalls 21b, 21b respectively on both ends in the first direction (x-direction) and on both ends in the second direction (y-direction). The lower case 21 also includes a bottom wall 21c at the lower end in the height direction (z-direction). The battery group 10 is in contact with one of the sidewalls 21a, 21a of the housing 20 in the first direction, i.e., the shorter direction of the housing 20.

The bottom surface of the housing 20, namely the lower surface of the bottom wall 21c of the lower case 21, is a support surface 100a of the battery pack 100 which is supported from below by an external mechanism in a state in which, for example, the battery pack 100 is attached to the external mechanism, such as a vehicle or a machine. The support surface 100a of the battery pack 100 is not limited to the bottom surface of the housing 20, and may be, for example, the lower surface of a flange-like protrusion provided to the sidewalls 21a, 21b of the housing 20, or a downward-facing surface of a recess provided to the sidewalls 21a, 21b of the housing 20. The support surface 100a of the battery pack 100 is parallel to the first direction (x-direction), i.e., the width W direction of the housing 20, and to the second direction (y-direction), i.e., the length L direction of the housing 20.

Figure 3:
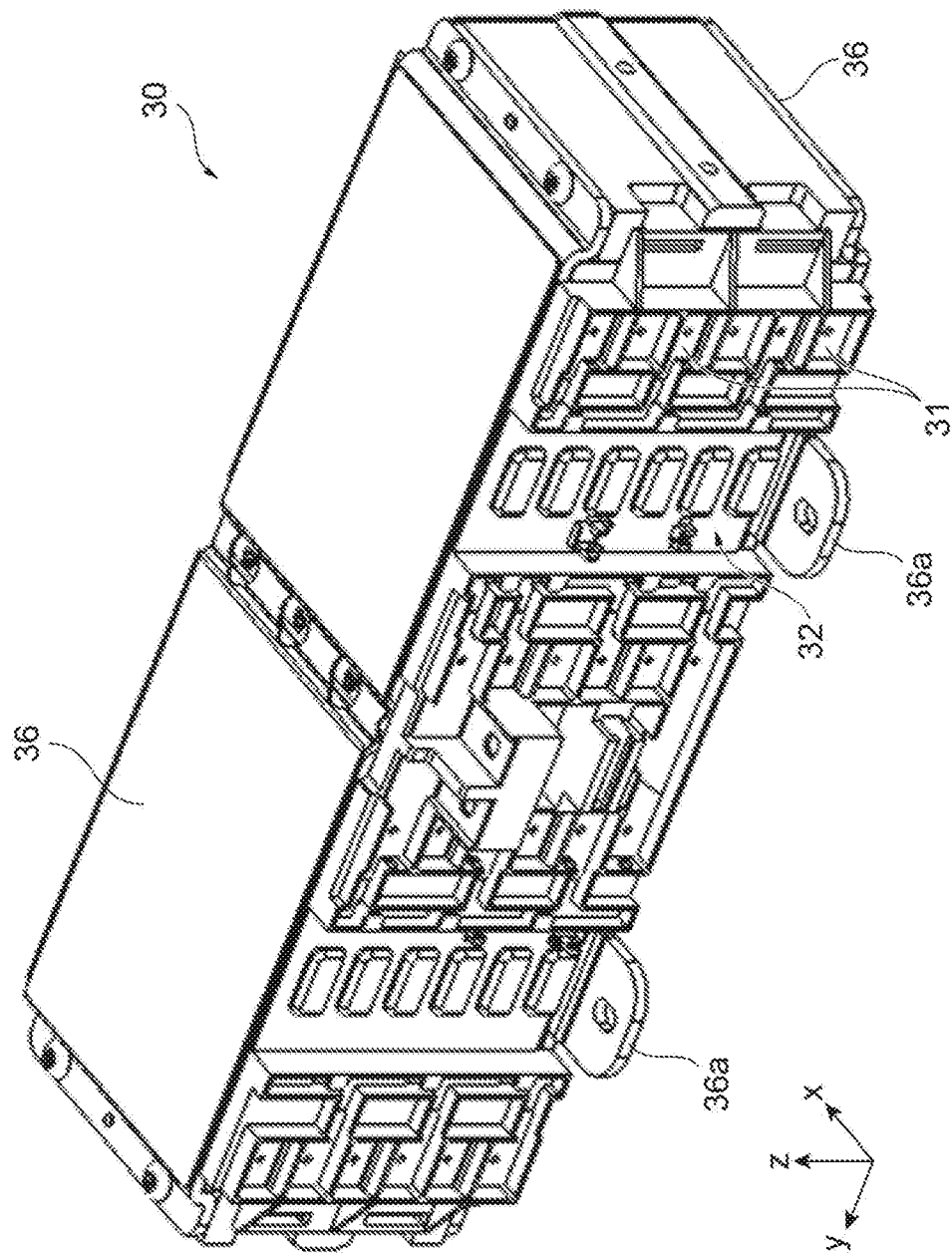
FIG. 3 is a perspective view of the battery module illustrated in FIG. 2.
Figure 4:
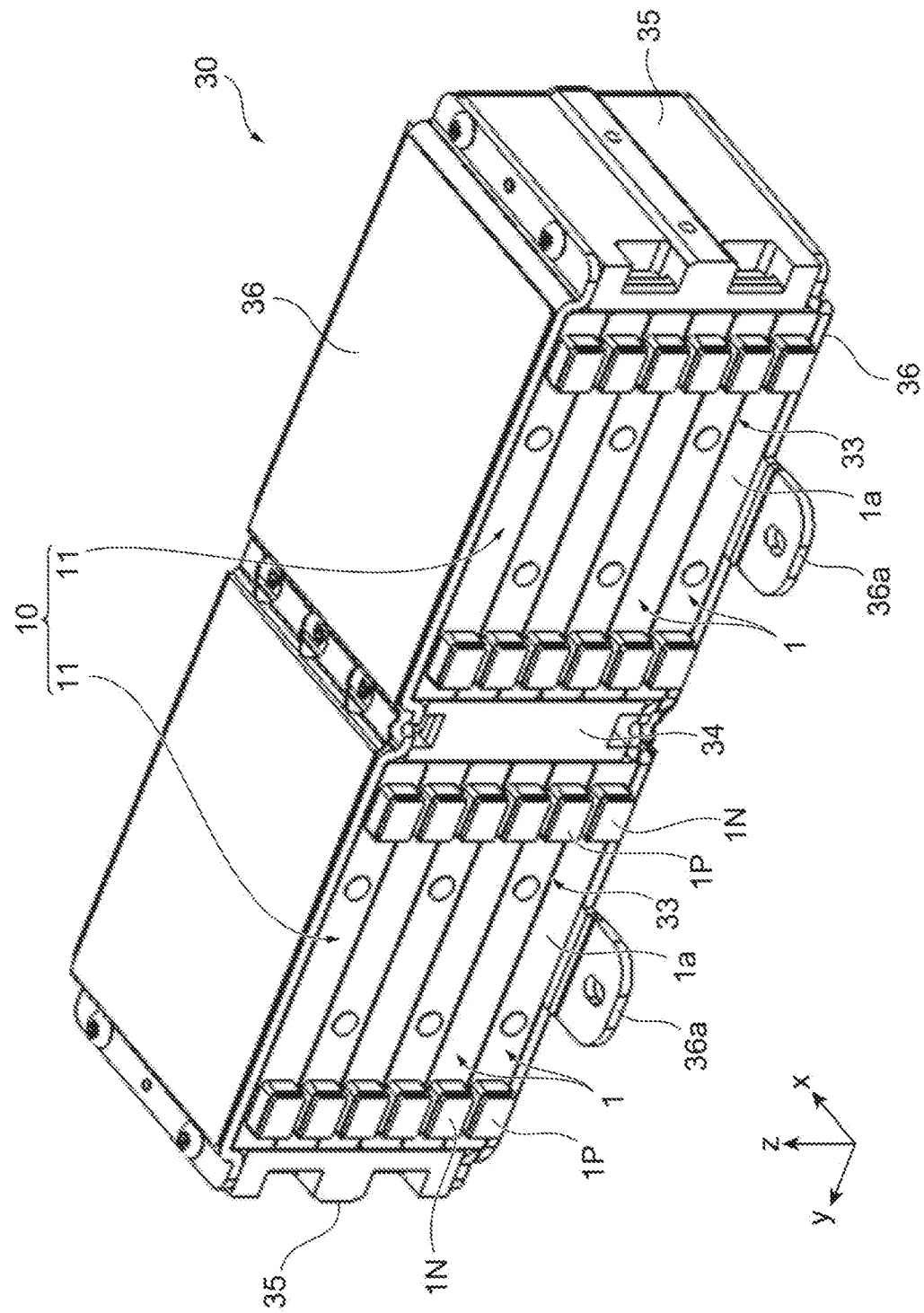
FIG. 4 is a perspective view of the battery module illustrated in FIG. 3 from which a bus bar case and the like have been detached.

FIG. 3 is a perspective view of the battery module 30 illustrated in FIG. 2. FIG. 4 is a perspective view of the battery module 30 from which bus bars 31 and a bus bar case 32 illustrated in FIG. 3 have been detached.

The battery module 30 is provided with a battery group 10 in which a plurality of battery cells 1 are stacked, for example. In the illustrated example, the dimension of the battery group 10 in the first direction (x-direction), i.e., the shorter direction of the housing 20, is made smaller than the dimension in the second direction (y-direction), i.e., the longer direction of the housing 20.

More particularly, in the illustrated example, the battery group 10 has the configuration in which a plurality of flat and rectangular battery cells 1 are stacked in the thickness direction via cell holders 33. The stacking direction of the plurality of battery cells 1 is the height direction (z-direction) of the housing 20. The battery group 10 includes battery columns 11 each made up of a plurality of battery cells 1 stacked in the height direction of the housing 20. In the illustrated example, the battery group 10 includes two battery columns 11 arranged in the second direction, i.e., the longer direction of the housing 20. Thus, the dimension of the battery group 10 in the first direction (x-direction) is made smaller than the dimension in the second direction (y-direction).

That is, the first direction (x-direction) is the shorter direction of the battery group 10, and the second direction (y-direction) is the longer direction thereof. In other words, the shorter direction of the battery group 10 is aligned with the shorter direction of the housing 20, and the longer direction of the battery group 10 is aligned with the longer direction of the housing 20. The number of the battery columns 11 constituting the battery group 10 is not particularly limited, and there may be one column or three or more columns.

The battery cells 1 constituting the battery group 10 are lithium ion secondary batteries, for example. The battery cells 1 are each provided with a flat and rectangular battery case, positive-electrode and negative-electrode cell terminals 1P, 1N provided on one end surface of the battery case, and an electrode group, not shown, which is accommodated in the battery case. The battery case is provided with a battery lid 1a having the cell terminals 1P, 1N, and a bottomed and rectangular-tube shaped battery can in which the electrode group is accommodated. The battery can has a pair of wide sidewalls disposed at both ends in the thickness direction and having the largest area, a pair of narrow sidewalls adjacent to the pair of wide side surfaces and parallel to the thickness direction, a bottom wall at one end of the wide side surfaces and narrow side surfaces, and an opening portion closed by the battery lid 1a on the side opposite to the bottom wall. The battery lid 1a is a generally oblong, thin and long plate-shaped member.

For example, if the longer direction of the battery cells 1 is the longer direction of the battery lid 1a, the longer direction of the plurality of battery cells 1 constituting the battery group 10 is aligned with the second direction (y-direction), i.e., the longer direction of the housing 20. In the illustrated example, the plurality of battery cells 1 constituting the battery group 10 are stacked in the thickness direction via the cell holders 33, and the wide side surfaces of battery cells 1 adjacent to each other are opposed to each other. The cell holders 33 are configured from an electrically insulating resin material, such as polybutylene terephthalate (PBT), and hold the individual battery cells 1 from both sides in the thickness direction. The wide side surfaces of the battery cells 1 are parallel to the support surface 100a of the housing 20, i.e., to the first direction (x-direction) and the second direction (y-direction), and are generally perpendicular to the height direction (z-direction) of the housing 20.

The plurality of battery cells 1 constituting the battery group 10 are stacked in the thickness direction with the positions of the positive-electrode and negative-electrode cell terminals 1P, 1N alternately reversed such that the positive-electrode cell terminal 1P of one battery cell 1 and the negative-electrode cell terminal 1N of another battery cell 1 adjacent thereto are adjacent to each other in the thickness direction of the battery cells 1. The positive-electrode cell terminal 1P of one battery cell 1 and the negative-electrode cell terminal 1N of the adjacent other battery cell 1 are connected by the bus bars 31, and the plurality of battery cells 1 in each of the battery columns 11 are connected in series.

The battery module 30 includes a center plate 34 disposed between the two columns of battery columns 11 adjacent to each other of the battery group 10. The battery module 30 also includes a pair of side plates 35, 35 disposed at both ends of the two columns of battery columns 11 arranged in the longer direction of the battery cells 1. The center plate 34 and the side plates 35, 35 are configured from an electrically insulating resin material, such as PBT. The battery module 30 also includes a pair of end plates 36, 36 disposed at both ends of the center plate 34 and the side plates 35, 35 in the stacking direction of the plurality of battery cells 1 of the battery group 10.

The end plates 36, 36 are plate-shaped members made of metal, for example. For example, the end plates 36, 36 are disposed opposing, via the cell holders 33, the wide side surfaces of the battery cells 1 at both ends of the battery columns 11 constituting the battery group 10. The end plates 36, 36 are fastened to both ends of the center plate 34 and the side plates 35, 35 in the stacking direction of the plurality of battery cells 1 of the battery group 10, using fastening members, such as bolts. Thus, the plurality of battery cells 1 of the battery group 10 are pressed in the thickness direction between the pair of end plates 36, 36 in a state in which the individual battery cells 1 are held by the cell holders 33 from both sides in the thickness direction. The end plate 36 on the lower side in the height direction of the housing 20 includes fixing portions 36a to be fixed to the bottom wall 21c of the housing 20 by fastening members, such as bolts.

The bus bar case 32 is a generally plate-shaped member configured from an electrically insulating resin material, such as PBT. The bus bar case 32 is disposed opposing the end portion on which the cell terminals 1P, 1N of the plurality of battery cells 1 constituting the battery group 10 are provided. The bus bar case 32 has compartments for arranging the bus bars 31 and opening portions for joining the bus bars 31 to the cell terminals 1P, 1N, for example, and provides insulation between adjacent bus bars 31.

Figure 5:
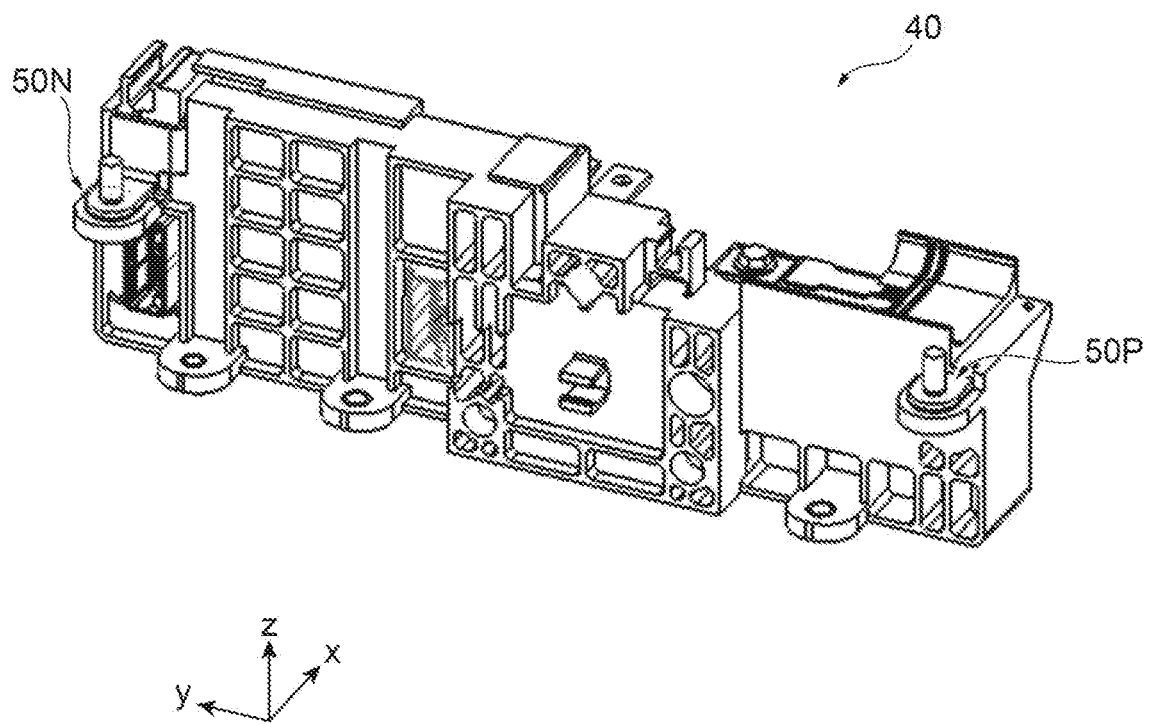
FIG. 5 is a perspective view of an electrical component holder illustrated in FIG. 2.
Figure 6:
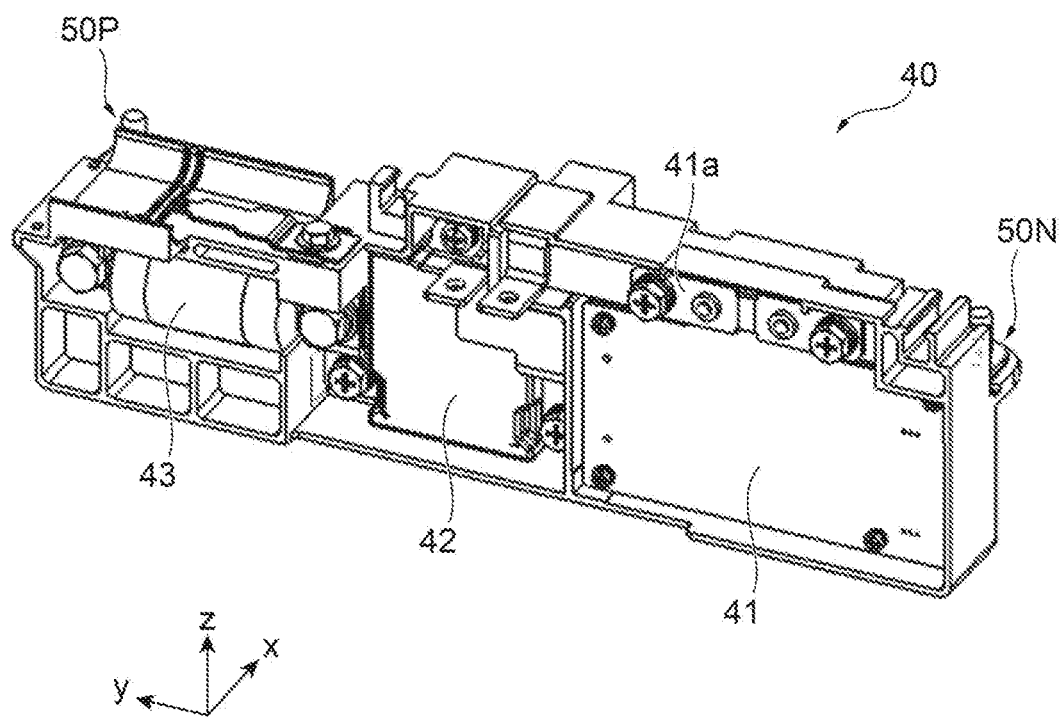
FIG. 6 is a perspective view of the electrical component holder illustrated in FIG. 5, as viewed from the opposite direction.

FIG. 5 is a perspective view of the electrical component holder 40 illustrated in FIG. 2. FIG. 6 is a perspective view of the electrical component holder 40 illustrated in FIG. 5, as viewed from the opposite direction.

The electrical component holder 40 holds electrical components constituting the battery pack 100, such as a substrate 41, a relay 42, and a fuse 43. The electrical component holder 40 is a generally oblong plate-shaped member configured from an electrically insulating resin material, such as PBT. The long-side direction, i.e., the longer direction, of the oblong electrical component holder 40 is aligned with the second direction (y-direction), i.e., the longer direction of the housing 20.

The substrate 41 has a circuit for controlling and monitoring the battery pack 100, for example, mounted thereon. The substrate 41 is connected to each of the bus bars 31 of the battery module 30, for example, and measures and monitors the voltage of each of the battery cells 1 constituting the battery group 10. The substrate 41 is fixed onto a surface of the electrical component holder 40 opposing the battery module 30 by fastening members, such as bolts. The substrate 41 also has a shunt resistor 41a. The shunt resistor 41a is fixed onto the electrical component holder 40 by fastening members, such as bolts.

The positive-electrode and negative-electrode module external terminals 50P, 50N are respectively provided at one end and the other end in the longer direction of the electrical component holder 40, for example. The module external terminals 50P, 50N, which may also be referred to as High Volt (HV) terminals, are connected to the battery group 10 of the battery module 30, and are connected to the plurality of series-connected battery cells 1 of each of the battery columns 11. In the illustrated example, the module external terminals 50P, 50N include stud bolts for connecting cables for supplying electric power to a vehicle, such as an electric vehicle or a hybrid electric vehicle, or to other electric equipment. The module external terminals 50P, 50N, however, may not include stud bolts.

The negative-electrode module external terminal 50N is connected to the shunt resistor 41a via a bus bar fixed in place by a screw, for example. Thus, the shunt resistor 41a constitutes a part of an electric current path between the negative-electrode module external terminal 50N and the battery group 10 of the battery module 30. The positive-electrode module external terminal 50P is connected to the relay 42 and the fuse 43 via a bus bar fixed in place by a screw, for example. Thus, the relay 42 and the fuse 43 constitute part of an electric current path between the positive-electrode module external terminal 50P and the battery group 10 of the battery module 30.

As illustrated in FIG. 1, the connector 60 is connected to one end in the second direction, i.e., the longer direction, of the housing 20, and is exposed on the outside of the upper cover 22 of the housing 20. The connector 60 is a connection terminal for transmitting and receiving signals to and from an external controller, and for receiving electric power supply from an external power supply. The connector 60 is connected, via cables, for example, to the substrate 41 held onto the electrical component holder 40. The battery pack 100 is connected to the external controller and power supply via the connector 60, for example.

As illustrated in FIG. 2, in the battery pack 100 of the present embodiment, the battery group 10 constituting the battery module 30 inside the housing 20 is eccentrically located on one side in the first direction (x-direction), i.e., the shorter direction of the housing 20. As described above, the battery pack 100 of the present embodiment is provided with various electrical components, including the substrate 41, the relay 42, and the fuse 43 which are held onto the electrical component holder 40 and accommodated in the housing 20. The electrical components are disposed on the side opposite to the one side, in the first direction (x-direction), on which the battery group 10 is eccentrically located inside the housing 20. In addition, as described above, the battery pack 100 of the present embodiment is provided with the module external terminals 50P, 50N connected to the plurality of battery cells 1 of the battery group 10 constituting the battery module 30. The module external terminals 50P, 50N are disposed on the side opposite to the one side, in the first direction (x-direction), on which the battery group 10 is eccentrically located.

In the following, the operation of the battery pack 100 of the present embodiment will be described.

Conventionally, in the field of rechargeable secondary battery, aqueous-system batteries such as lead batteries, nickel-cadmium batteries, and nickel-hydrogen batteries have been dominant. However, as the electric equipment has become increasingly smaller and lighter, attention has been focused on lithium secondary batteries having high energy density, and their research, development, and commercialization have been rapidly advanced.

Meanwhile, in view of the problems of global warming and depletable fuels, various car manufacturers have developed electric vehicles (EV) and hybrid electric vehicles (HEV) of which the driving is partly assisted by an electric motor, and there is a demand for high-capacity and high-output secondary batteries as a power supply for such vehicles. As a suitable power supply to meet the demand, attention is being focused on a non-aqueous-system lithium secondary battery having high voltage. Particularly, a prismatic lithium secondary battery has high volumetric efficiency when packaged. Accordingly, there is a growing expectation for the development of a prismatic lithium secondary battery for HEV or EV purposes.

Against such background, the numbers of electric vehicles (EV) and hybrid electric vehicles (HEV) produced are increasing. Since the battery pack 100 incorporates charged batteries, it is necessary to enhance work safety during handling. However, in the conventional power storage apparatus described in Patent Literature 1, for example, the connector box, which is lighter than the other members such as the power storage modules, is provided at one end in the longer direction of the power storage apparatus. Accordingly, during the handling of the power storage apparatus, because the center of gravity of the power storage apparatus is deviated toward the side opposite to the connector box in the longer direction of the power storage apparatus, the power storage apparatus may lose balance and become unstable, and work safety may deteriorate.

Figure 7:
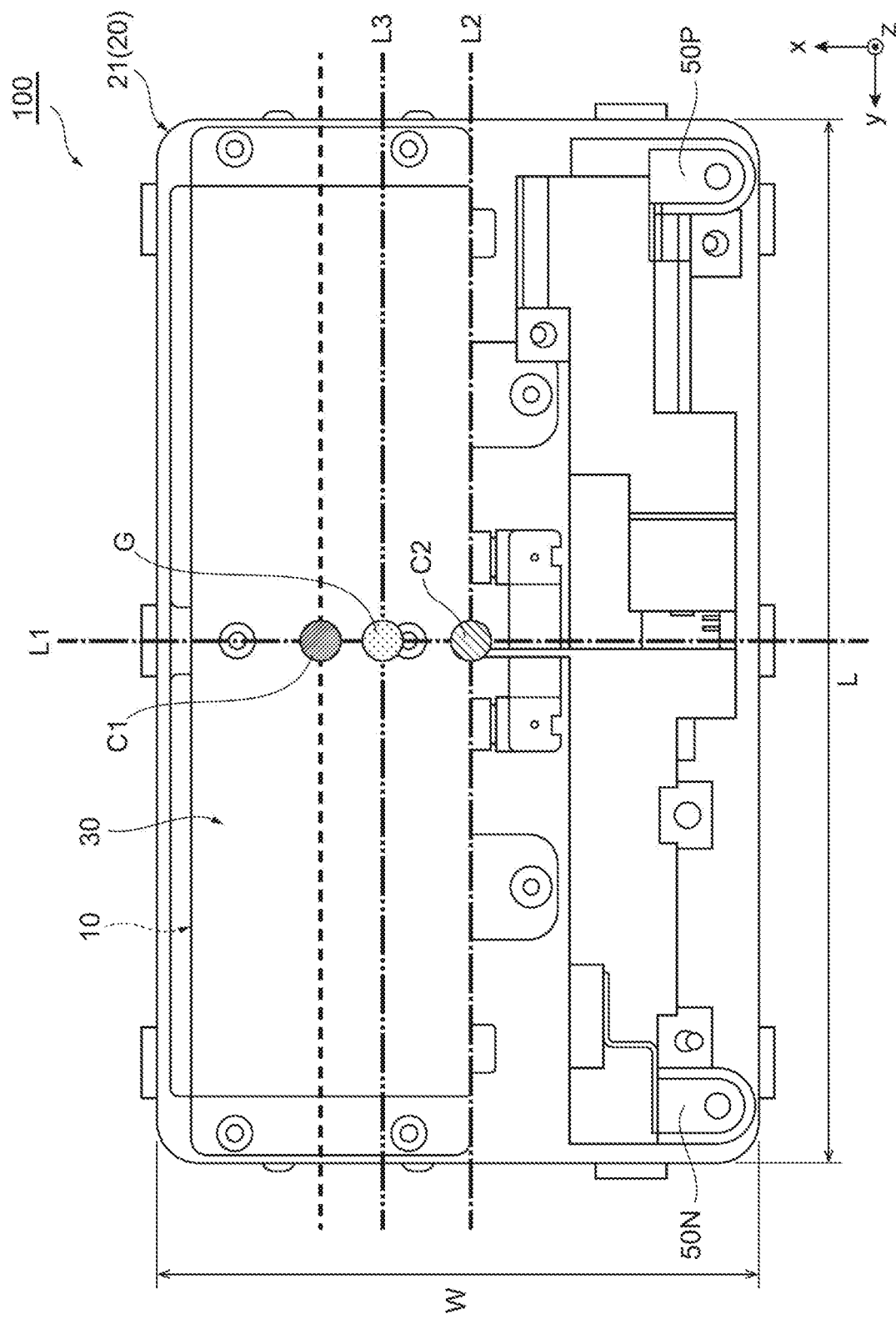
FIG. 7 is a plan view of the battery pack illustrated in FIG. 1 in a state in which an upper cover of a housing thereof is detached.

FIG. 7 is a plan view of the battery pack 100 illustrated in FIG. 1 in a state in which the upper cover 22 of the housing 20 is detached. In contrast to the conventional power storage apparatus described above, the battery pack 100 of the present embodiment has the following configuration. That is, the battery pack 100 of the present embodiment is provided with the battery group 10 having a plurality of battery cells 1, and with the housing 20 in which the battery group 10 is accommodated. The housing 20, with respect to the first direction (x-direction) and the second direction (y-direction) which are perpendicular to the height direction (z-direction) of the housing 20 and to each other, has the width W, i.e., the dimension in the first direction, which is made smaller than the length L, which is the dimension in the second direction. The battery group 10 is eccentrically located on one side in the first direction inside the housing 20.

Due to this configuration, in the first direction (x-direction), i.e., the shorter direction of the housing 20, the position of the center G of gravity of the battery pack 100 is positioned between the center position C1 of the battery group 10, i.e., the center position C1 of the battery module 30, and the center position C2 of the housing 20, i.e., the center position C2 of the battery pack 100. In other words, the position of the center G of gravity of the battery pack 100 is deviated toward the one side, in the first direction, i.e., the shorter direction of the housing 20, on which the battery group 10 is eccentrically located. The position of the center G of gravity of the battery pack 100 is thus deviated from the center position C2 of the battery pack 100 due to the battery group 10, which is the heaviest one of the components constituting the battery pack 100, is eccentrically located on one side in the first direction, i.e., the shorter direction of the housing 20.

Thus, as the position of the center G of gravity of the battery pack 100 is eccentrically located on one side in the first direction, i.e., the shorter direction of the housing 20, it becomes easy to carry the battery pack 100 during the work of handling the battery pack 100. More particularly, during the work of handling the battery pack 100, the worker holds both ends, in the second direction, i.e., the longer direction, of the housing 20 which are relatively easy to hold. In this case, by holding the housing 20 from the one side in the first direction, i.e., the shorter direction of the housing 20, toward which the center G of gravity of the battery pack 100 is deviated, it is possible to bring the center G of gravity of the battery pack 100 closer to the body of the worker. In this way, the battery pack 100 can be carried stably, improving the workability and safety of the work of handling the battery pack 100, such as attaching or detaching the battery pack 100.

Further, the battery pack 100 of the present embodiment has a generally symmetric configuration with respect to a center line L1 parallel to the first direction (x-direction), i.e., the shorter direction of the housing 20. Accordingly, the weight of one side portion and that of the other side portion bounded by the center line L1 parallel to the first direction become generally the same. Thus, the position of the center G of gravity of the battery pack 100 is positioned on or in the vicinity of the center line L1 parallel to the first direction. Accordingly, when the worker holds both ends in the second direction (y-direction), i.e., the longer direction, of the housing 20 which are relatively easy to hold, the center G of gravity is positioned at the center in the second direction of the battery pack 100. Thus, it is possible to carry the battery pack 100 more stably.

The battery pack 100 of the present embodiment is also provided with the module external terminals 50P, 50N connected to the plurality of battery cells 1 of the battery group 10. The module external terminals 50P, 50N are disposed on the side opposite to the one side in the first direction (x-direction), i.e., the shorter direction of the housing 20, on which the battery group 10 is eccentrically located. Thus, as described above, when the worker holds the housing 20 from the one side in the first direction, i.e., the shorter direction of the housing 20, toward which the center G of gravity of the battery pack 100 is deviated, it is possible to arrange the module external terminals 50P, 50N away from the body of the worker. Thus, the worker is prevented from coming into contact with the module external terminals 50P, 50N, and the safety during the work of handling the battery pack 100 is improved.

In the battery pack 100 of the present embodiment, the housing 20 has the sidewalls 21a, 21a at both ends in the first direction (x-direction). The battery module 30 constituting the battery group 10 is in contact with one of the sidewalls 21a, 21a at both ends in the first direction of the housing 20. Thus, it is possible to make sure that the battery group 10 is eccentrically located on one side in the first direction, i.e., the shorter direction of the housing 20 reliably, and that the center G of gravity of the battery pack 100 is deviated toward the one side in the first direction, i.e., the shorter direction of the housing 20 more reliably. Further, it is possible to ensure a wider space on the side opposite to the battery pack 100 in the first direction, i.e., the shorter direction of the housing 20, and to ensure a sufficient space for accommodating the electrical components and other components of the battery pack 100 in the housing 20.

In the battery pack 100 of the present embodiment, the dimension of the battery group 10 constituting the battery module 30 in the first direction (x-direction) is made smaller than the dimension in the second direction (y-direction). That is, the battery group 10 has the smaller-dimension shorter direction corresponding to the first direction, and the larger-dimension longer direction corresponding to the second direction. Specifically, the shorter direction of the battery group 10 is aligned with the shorter direction of the housing 20, and the longer direction of the battery group 10 is aligned with the longer direction of the housing 20. With this configuration, it is possible, when the battery group 10 is eccentrically located on one side in the first direction, i.e., the shorter direction of the housing 20, to ensure a sufficient dimension of the battery group 10 in the second direction, i.e., the longer direction of the housing 20. Accordingly, it becomes possible to ensure sufficient volume and capacity of the battery group 10.

In the battery pack 100 of the present embodiment, the battery group 10 has a configuration in which the flat and rectangular battery cells 1 are stacked in the thickness direction. The stacking direction of the battery cells 1 is the height direction (z-direction) of the housing 20. Thus, by increasing or decreasing the number of the battery cells 1 that are stacked in the battery group 10, it becomes possible to increase or decrease the dimension in the height direction (z-direction) of the housing 20. In addition, because the dimension in the thickness direction of the battery cells 1 is smaller than the lengthwise and widthwise dimensions of the wide side surfaces of the battery cells 1, by decreasing the number of the battery cells 1 that are stacked, it becomes possible to provide a compact and thin battery pack 100 in which the dimension of the housing 20 in the height direction (z-direction) is smaller than the lengthwise and widthwise dimensions of the wide side surfaces of the battery cells 1.

In the battery pack 100 of the present embodiment, the battery group 10 has a plurality of battery columns 11 in which a plurality of battery cells 1 are stacked. The plurality of battery columns 11 are arranged in the second direction (y-direction), i.e., the longer direction of the housing 20. Thus, by increasing the number of the battery columns 11, it is possible to increase the number of the battery cells 1 in the battery group 10, while limiting or preventing an increase in the dimensions of the battery group 10 in the height direction (z-direction) of the housing 20 and in the first direction (x-direction), i.e., the shorter direction of the housing 20.

The battery pack 100 of the present embodiment is also provided with the substrate 41, the relay 42, and the fuse 43 accommodated in the housing 20. The substrate 41, the relay 42, and the fuse 43 are disposed on the side opposite to the one side in the first direction on which the battery group 10 is eccentrically located inside the housing 20. Because the weight of the electrical components is light compared to the weight of the battery group 10, the center G of gravity of the battery pack 100 can be deviated without problems even when the electrical components are disposed on the side opposite to the battery group 10 in the first direction (x-direction), i.e., the shorter direction of the housing 20. In addition, it is possible to provide a compact battery pack 100 in which the space provided by the eccentric location of the battery pack 100 in the first direction is effectively utilized.

In the battery pack 100 of the present embodiment, the housing 20 has the support surface 100a to be supported from below by an external mechanism in a state in which the housing 20 is attached to the external mechanism. The support surface 100a of the housing 20 is parallel to the first direction (x-direction), i.e., the shorter direction of the housing 20 and to the second direction (y-direction), i.e., the longer direction of the housing 20. Due to this configuration, during work for having the support surface 100a of the battery pack 100, i.e., the lower surface of the bottom wall 21c of the housing 20, supported by the external mechanism, the worker or an industrial robot can carry the battery pack 100 stably by holding the battery pack 100 from the one side in the first direction toward which the center G of gravity of the housing 20 of the battery pack 100 is deviated. Thus, the safety during the work of handling the battery pack 100 is improved.

As described above, the present embodiment provides the battery pack 100 having a plurality of battery cells 1, the battery pack 100 making it possible to achieve higher safety than before during handling work.

Second Embodiment

Figure 8:
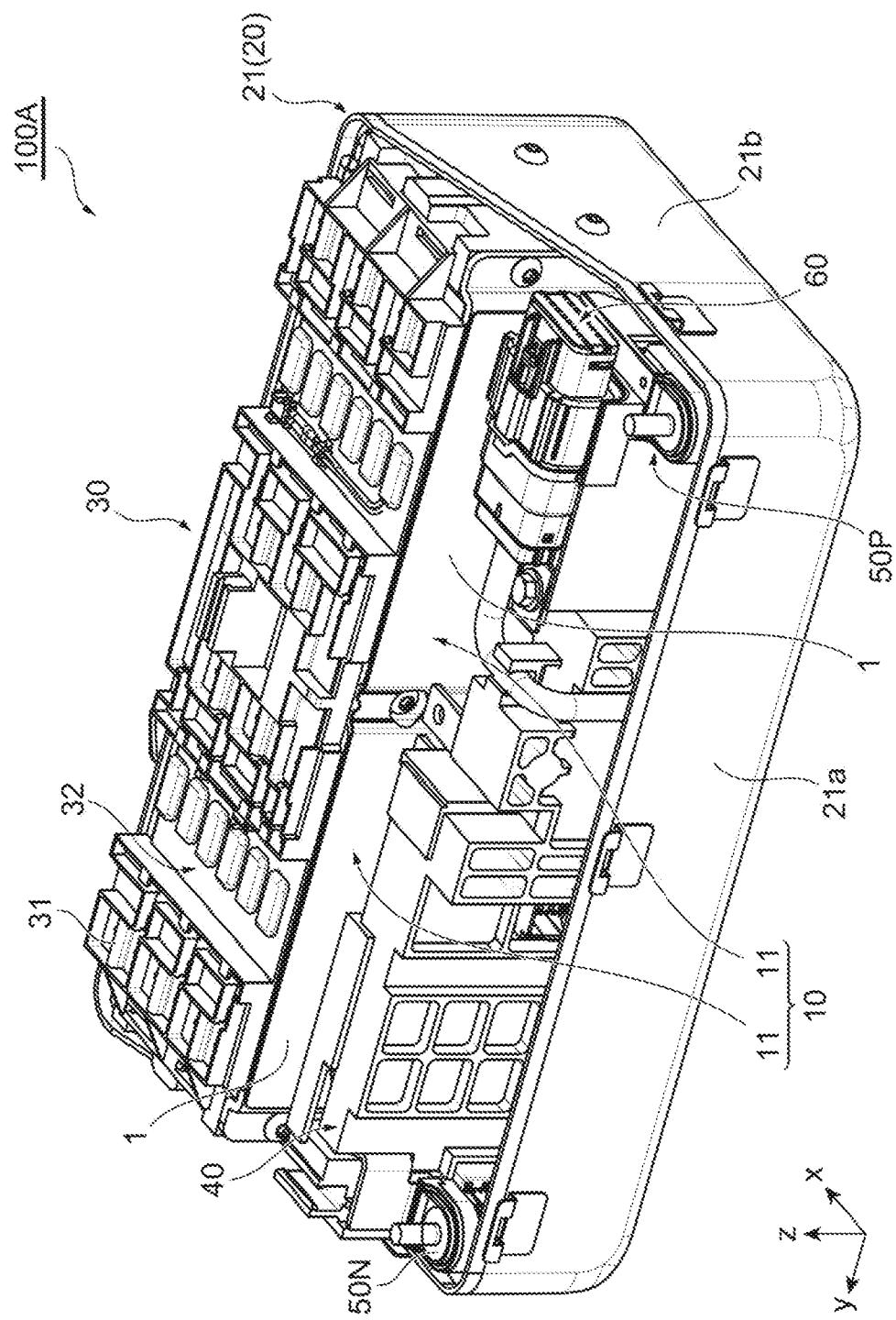
FIG. 8 is a perspective view of a battery pack according to a second embodiment of the present invention.

A battery pack 100A according to a second embodiment of the present invention will be described with reference to FIG. 8, as well as FIG. 1 to FIG. 4. FIG. 8 is a perspective view of the battery pack 100A according to the second embodiment of the present invention. FIG. 8, as in FIG. 2 illustrating the battery pack 100 of the first embodiment, illustrates the state in which the upper cover 22 of the housing 20 has been detached. The battery pack 100A of the present embodiment differs from the battery pack 100 described in the first embodiment mainly in the configuration of the battery module 30. The battery pack 100A of the present embodiment is similar to the battery pack 100 of the first embodiment in other respects. Accordingly, similar portions are designated with similar reference signs and their description will be omitted.

In the battery pack 100A of the present embodiment, the battery group 10 constituting the battery module 30 has the configuration in which a plurality of flat and rectangular battery cells 1 are stacked in the thickness direction. However, the stacking direction of the battery cells 1 is the first direction (x-direction), i.e., the shorter direction of the housing 20. More specifically, the arrangement of the battery module 30 with the configuration similar to that of the battery pack 100 of the first embodiment illustrated in FIG. 2 to FIG. 4 is rotated by 90°, so that the surfaces on which the cell terminals 1P, 1N of the battery cells 1 constituting the battery group 10 are provided face upward in the height direction (z-direction) of the housing 20. The bus bar case 32 is also disposed on top of the battery group 10 in the height direction of the housing 20.

The battery pack 100A of the present embodiment, as in the case of the battery pack 100 of the first embodiment, is provided with the battery group 10 having a plurality of battery cells 1, and the housing 20 in which the battery group 10 is accommodated. The housing 20, with respect to the first direction (x-direction) and the second direction (y-direction) perpendicular to the height direction (z-direction) of the housing 20 and to each other, has the dimension in the first direction made smaller than the dimension in the second direction. The battery group 10 is eccentrically located on one side in the first direction inside in the housing 20. Accordingly, with the battery pack 100A of the present embodiment, as with the battery pack 100 of the first embodiment, it is possible to achieve higher safety than before during handling work.

Further, because the stacking direction of the battery cells 1 is the first direction (x-direction), i.e., the shorter direction of the housing 20, even when the number of the battery cells 1 stacked is increased or decreased, it is not necessary to increase or decrease the dimension in the height direction (z-direction) of the housing 20. Accordingly, the battery pack 100A of the present embodiment is advantageous when the dimension in the height direction of the housing 20 is restricted. In addition, because the wide side surfaces of both ends of the battery cells 1 in the thickness direction face the first direction, i.e., the shorter direction of the housing 20, the electrode groups in the battery cells 1 are prevented from being moved due to vibrations or shock in the first direction. Thus, it is possible to improve the durability of the battery cells 1.

Third Embodiment

Figure 9:
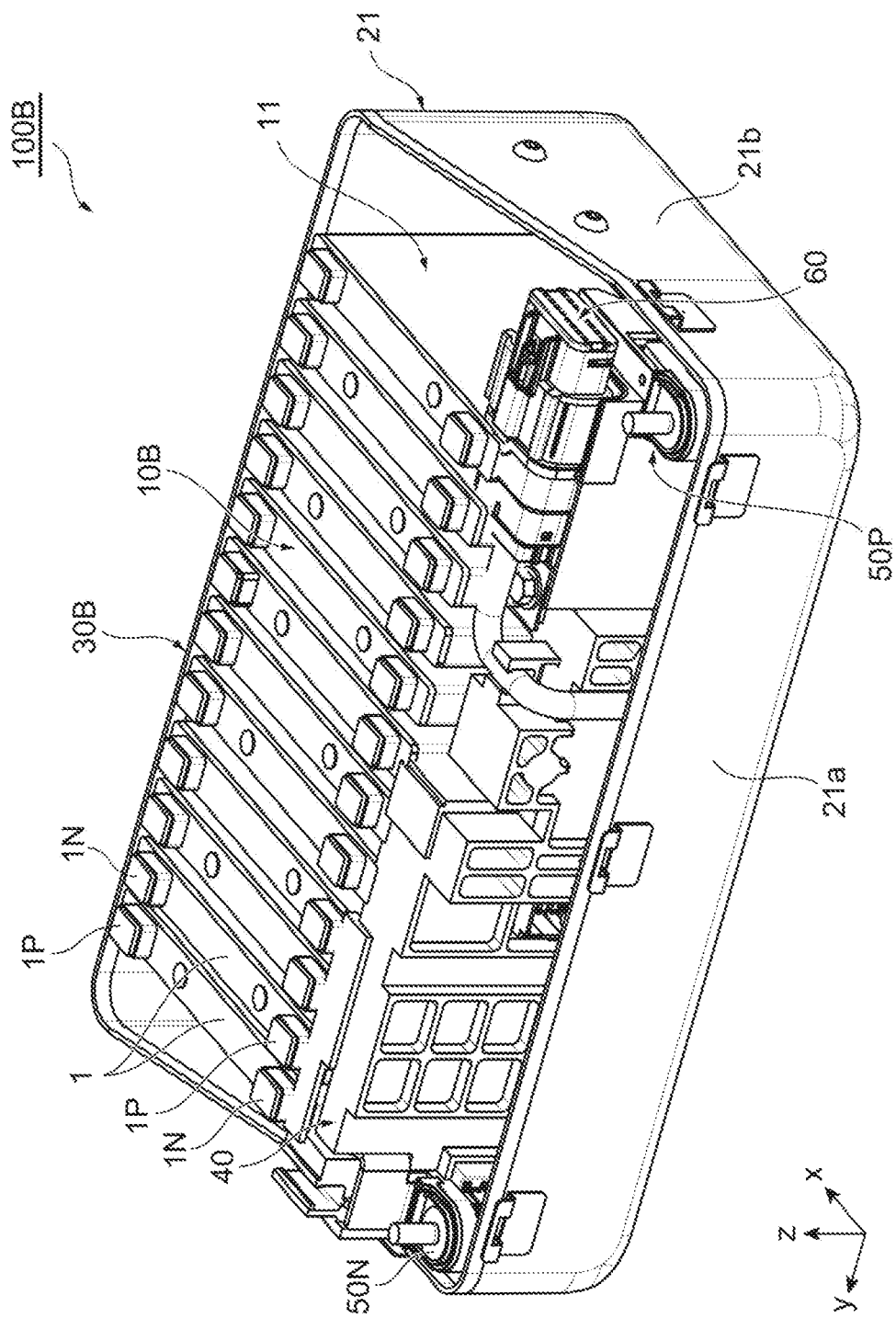
FIG. 9 is a perspective view of a battery pack according to a third embodiment of the present invention.

With reference to FIG. 9 as well as FIG. 1 to FIG. 4, a battery pack 100B according to a third embodiment of the present invention will be described. FIG. 9 is a perspective view of the battery pack 100B according to the third embodiment of the present invention. FIG. 9, as in FIG. 2 illustrating the battery pack 100 of the first embodiment, illustrates the state in which the upper cover 22 of the housing 20 has been detached. The battery pack 100B of the present embodiment differs from the battery pack 100 described in the first embodiment mainly in the configuration of a battery module 30B. The battery pack 100B of the present embodiment is similar to the battery pack 100 of the first embodiment in other respects. Accordingly, similar portions are designated with similar reference signs, and their description will be omitted.

In the battery pack 100B of the present embodiment, the battery group 10 constituting the battery module 30B has the configuration in which a plurality of flat and rectangular battery cells 1 are stacked in the thickness direction. However, the stacking direction of the battery cells 1 is the second direction (y-direction), i.e., the longer direction of the housing 20. More specifically, in the battery module 30B of the present embodiment, the battery cells 1 constituting the battery group 10B have the surfaces on which the cell terminals 1P, 1N are provided facing upward in the height direction of the housing 20, and have the wide side surfaces facing the second direction, i.e., the longer direction of the housing 20. In addition, the battery group 10B is provided with a single battery column 11. The bus bar case 32 (see FIG. 3) is disposed on top of the battery group 10B in the height direction of the housing 20.

The battery pack 100B of the present embodiment, as in the case of the battery pack 100 of the first embodiment, is provided with the battery group 10 having a plurality of battery cells 1B, and the housing 20 accommodating the battery group 10B. The housing 20, with respect to the first direction (x-direction) and the second direction (y-direction) perpendicular to the height direction of the housing 20 and to each other, has the dimension in the first direction made smaller than the dimension in the second direction. The battery group 10B is eccentrically located on one side in the first direction inside the housing 20. Accordingly, with the battery pack 100B of the present embodiment, as with the battery pack 100 of the first embodiment, it is possible to achieve higher safety than before during handling work.

Further, because the stacking direction of the battery cells 1 is the second direction (y-direction), i.e., the longer direction of the housing 20, even when the number of the battery cells 1 stacked is increased or decreased, it is not necessary to increase or decrease the dimension in the height direction (z-direction) of the housing 20. Accordingly, the battery pack 100B of the present embodiment is advantageous when the dimension in the height direction of the housing 20 is restricted. In addition, because the wide side surfaces of both ends of the battery cells 1 in the thickness direction face the second direction, i.e., the longer direction of the housing 20, the electrode group in the battery cells 1 is prevented from being moved in the second direction due to vibrations or shock. Thus, it is possible to improve the durability of the battery cells 1.

In the present embodiment, the battery cells 1 constituting the battery group 10B have the surfaces on which the cell terminals 1P, 1N are provided facing upward in the height direction (z-direction) of the housing 20. However, the surfaces on which the surfaces on which the cell terminals 1P, 1N are provided may face the first direction (x-direction), i.e., the shorter direction of the housing 20. In this case, the surfaces of the battery cells 1 constituting the battery group 10 on which the cell terminals 1P, 1N are provided face the electrical component holder 40 disposed on the side opposite to the battery group 10 in the first direction, and the bus bar case 32 (see FIG. 3) is disposed between the battery group 10B and the electrical component holder 40, as in the battery pack 100 of the first embodiment. With this configuration, it is also possible to obtain effects similar to those of the battery pack 100B of the present embodiment.

Fourth Embodiment

Figure 10A:
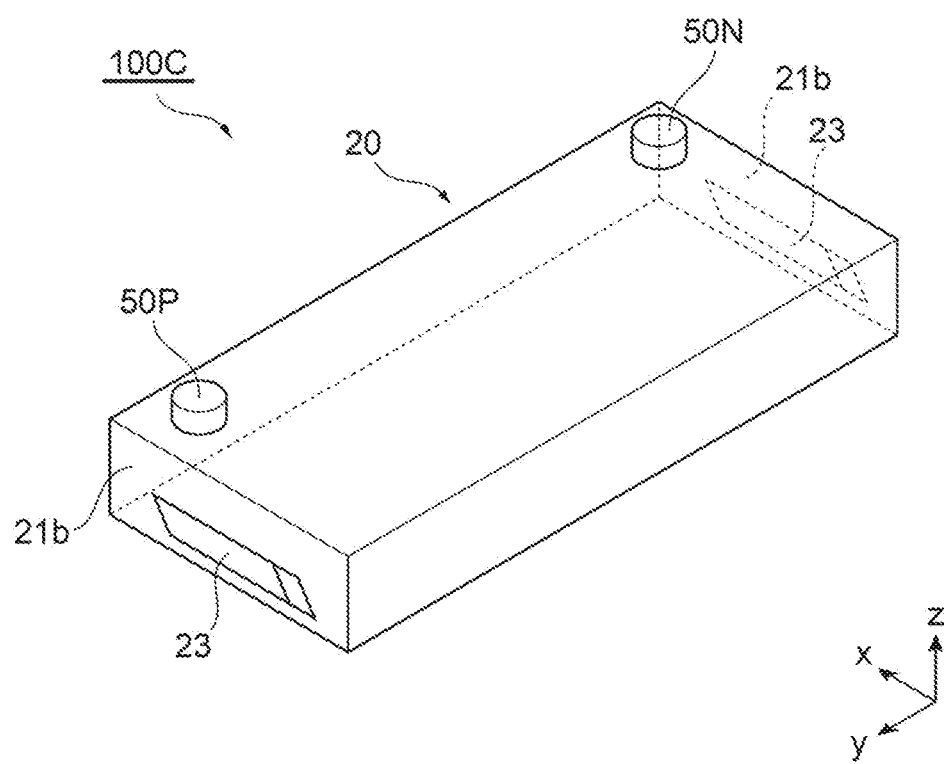
FIG. 10A is a schematic perspective view illustrating an example of a battery pack according to a fourth embodiment of the present invention.
Figure 10B:
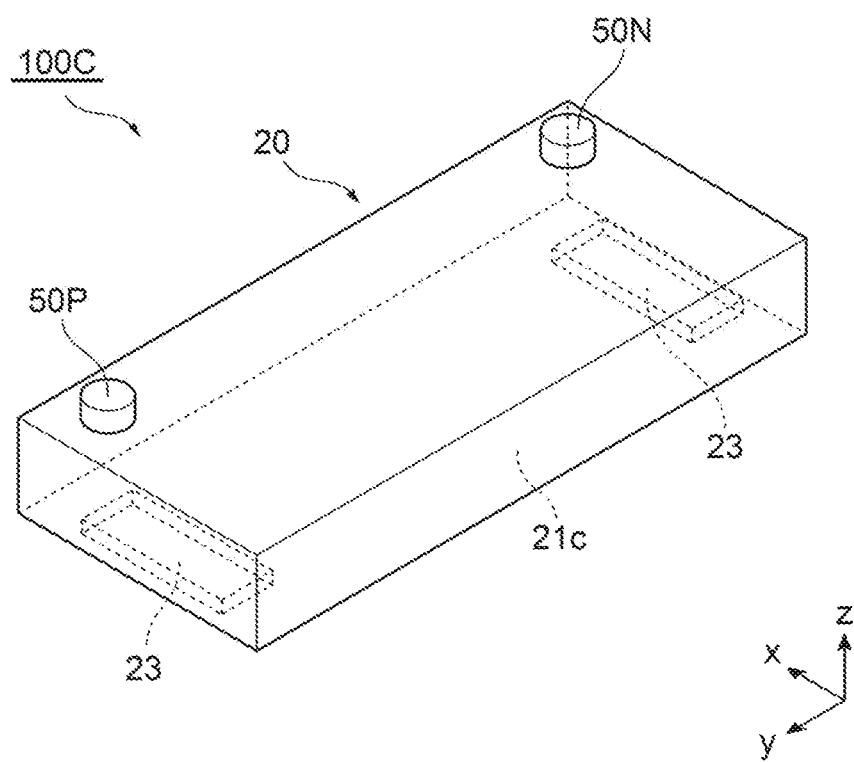
FIG. 10B is a schematic perspective view illustrating an example of the battery pack according to the fourth embodiment of the present invention.

With reference to FIG. 10A and FIG. 10B, as well as FIG. 1, FIG. 2, and FIG. 7, a battery pack 100C according to a fourth embodiment of the present invention will be described. FIG. 10A and FIG. 10B are schematic perspective views each illustrating an example of the battery pack 100C according to the fourth embodiment of the present invention. In FIG. 10A and FIG. 10B, illustration of portions other than the housing 20 of the battery pack 100C and the module external terminals 50P, 50N is omitted. The battery pack 100C of the present embodiment differs from the battery pack 100 described in the first embodiment mainly in the configuration of the housing 20. The battery pack 100C of the present embodiment is similar to the battery pack 100 of the first embodiment in other respects. Accordingly, similar portions are designated with similar reference signs, and their description will be omitted.

The housing 20 of the battery pack 100C of the present embodiment has handles 23, 23 at both ends in the second direction (y-direction), i.e., the longer direction of the housing 20. In the example illustrated in FIG. 10A, the housing 20 has recessed handles 23, 23 in the sidewalls 21b, 21b at both ends in the second direction. In the example illustrated in FIG. 10B, the housing 20 has recessed handles 23, 23 in the bottom wall 21c at both ends thereof in the second direction. The handles 23, 23 are not limited to the recessed shape, and may have a protruding shape.

Thus, the battery pack 100C has the handles 23, 23 at both ends in the second direction (y-direction), i.e., the longer direction of the housing 20. Accordingly, the worker can hold the housing 20 of the battery pack 100C easily, making it possible to carry the battery pack 100C easily. In addition, the worker is prevented from erroneously holding the housing 20 at both ends thereof in the first direction (x-direction), i.e., the shorter direction, making it possible to further improve the safety during the work of handling the battery pack 100C.

Preferably, the handles 23, 23 are provided between the center position C2 of the housing 20 and the center position C1 of the battery group 10 in the first direction (x-direction), i.e., the shorter direction of the housing 20, so as to correspond to the position of the center G of gravity of the battery pack 100 illustrated in FIG. 7. In this way, when the worker holds the handles 23, 23 of the housing 20 of the battery pack 100C, the battery pack 100C becomes more stable and can be carried easily, making it possible to further improve the safety the work of handling the battery pack 100C.

Fifth Embodiment

Figure 11:
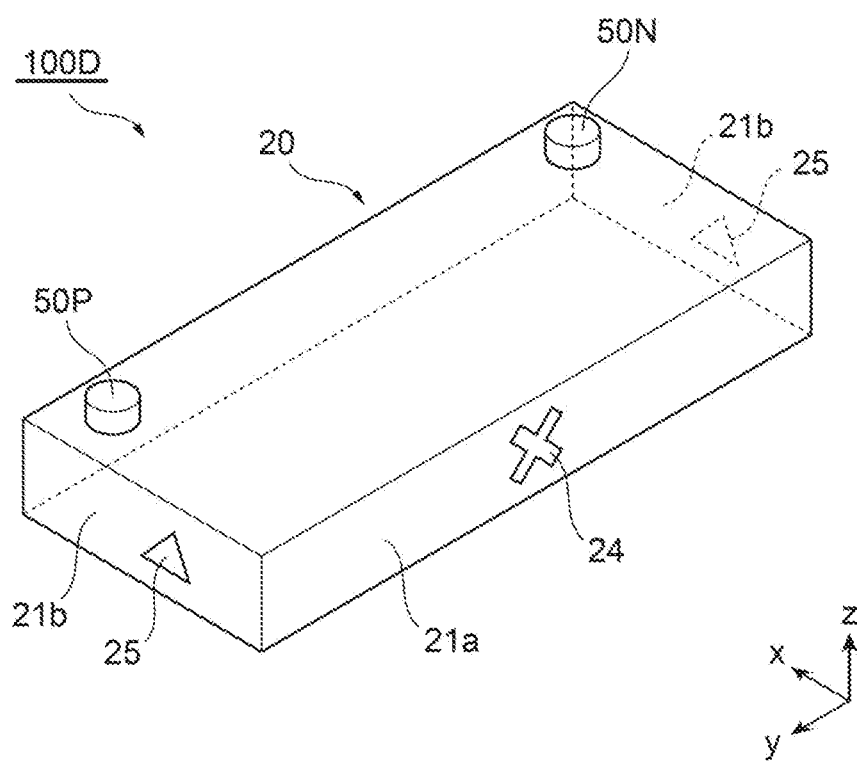
FIG. 11 is a schematic perspective view of a battery pack according to a fifth embodiment of the present invention.

With reference to FIG. 11 as well as FIG. 1, FIG. 2, and FIG. 7, a battery pack 100D according to a fifth embodiment of the present invention will be described. FIG. 11 is a schematic perspective view illustrating an example of the battery pack 100D according to the fifth embodiment of the present invention. In FIG. 11, illustration of portions other than the housing 20 of the battery pack 100D and the module external terminals 50P, 50N is omitted. The battery pack 100D of the present embodiment differs from the battery pack 100 of the first embodiment mainly in the configuration of the housing 20. The battery pack 100D of the present embodiment is similar to the battery pack 100 of the first embodiment in other respects. Accordingly, similar portions are designated with similar reference signs, and their description will be omitted.

The housing 20 of the battery pack 100D of the present embodiment has a marker 24 on one sidewall 21a in the first direction (x-direction), i.e., the shorter direction, for example, indicating the one side on which the battery group 10 is eccentrically located. For example, the marker 24 is affixed to an outer surface of the sidewall 21a of the housing 20 on the one side on which the battery group 10 is eccentrically located in the first direction. The marker 24 indicates, for example, the recommended position suitable for handling when the worker handles the battery pack 100D. Non-limiting examples of the marker 24 include printing performed on the sidewall 21a of the housing 20, irregularities provided on the sidewall 21a of the housing 20, a sticker affixed to the sidewall 21a of the housing 20, and a face plate welded to the sidewall 21a of the housing 20.

The marker 24 indicating the one side on which the battery group 10 is eccentrically located may display, for example, an arbitrary letter, a figure, a sign, a color, or a combination of one or more of the above. In the illustrated example, the marker 24 is a protruding cross-sign or X-sign provided at the center in the longer direction of the sidewall 21b of the housing 20. By thus providing the housing 20 of the battery pack 100D with the marker 24 indicating the one side on which the battery group 10 is eccentrically located in the first direction (x-direction), i.e., the located shorter direction, the worker can easily recognize the recommended direction in which the battery pack 100D can be stably supported. Accordingly, with the battery pack 100D of the present embodiment, it is possible to further improve the safety during the work of handling the battery pack 100D.

The housing 20 of the battery pack 100D of the present embodiment also has markers 25, 25 on both of the sidewalls 21b, 21b in the second direction (y-direction), i.e., the longer direction, indicating holding positions. The markers 25, 25 are formed, for example, at positions corresponding to the position of the center G of gravity of the battery pack 100 in the first direction (x-direction) of the housing 20, as illustrated in FIG. 7, such as at positions intersecting a straight line L3 passing the position of the center G of gravity of the battery pack 100 and parallel to the second direction.

As illustrated in FIG. 10A and FIG. 10B, when the housing 20 has the handles 23, 23, the markers 25, 25 may be formed at positions indicating the positions of the handles 23, 23. Non-limiting examples of the markers 25, 25 indicating the holding positions include, as in the case of the marker 24 indicating the one side on which the battery group 10 is eccentrically located, printing performed on the sidewalls 21b, 21b of the housing 20, irregularities provided on the sidewalls 21b, 21b of the housing 20, a sticker affixed to the sidewalls 21b, 21b of the housing 20, and a face plate welded to the sidewalls 21b, 21b of the housing 20.

The markers 25, 25 indicating the holding positions, as in the case of the marker 24 indicating the one side on which the battery group 10 is eccentrically located, may display, for example, an arbitrary letter, a figure, a sign, a color, or a combination of one or more of the above. In the illustrated example, the markers 25, 25 indicating the holding positions are protruding triangular signs or arrows provided at the center in the shorter direction on the sidewalls 21b, 21b of the housing 20.

By thus providing both of the sidewalls 21b, 21b in the second direction (y-direction), i.e., the longer direction, of the housing 20 of the battery pack 100D with the markers 25, 25 indicating the holding positions, the worker can easily recognize the recommended positions for holding the battery pack 100D stably. Accordingly, with the battery pack 100D of the present embodiment, it is possible to further improve the safety during the work of handling the battery pack 100D.

Sixth Embodiment

With reference to FIG. 12A to FIG. 12D as well as FIG. 1 and FIG. 2, a battery pack 100E according to a sixth embodiment of the present invention will be described. FIG. 12A to FIG. 12D are schematic perspective views each illustrating an example of the battery pack 100E according to the sixth embodiment of the present invention. In FIG. 12A to FIG. 12D, illustration of portions other than the housing 20 of the battery pack 100E and the module external terminals 50P, 50N is omitted. The battery pack 100E of the present embodiment differs from the battery pack 100 of the first embodiment mainly in the configuration of the module external terminals 50P, 50N. The battery pack 100E of the present embodiment is similar to the battery pack 100 of the first embodiment in other respects. Accordingly, similar portions are designated with similar reference signs, and their description will be omitted.

In the battery pack 100E of the present embodiment, the positive-electrode module external terminal 50P and the negative-electrode module external terminal 50N are provided adjacent to each other at one end in the second direction (y-direction), i.e., the longer direction, of the housing 20. More particularly, in the example illustrated in FIG. 12A, the positive-electrode module external terminal 50P and the negative-electrode module external terminal 50N are provided at one end in the second direction of the housing 20 of the battery pack 100E, and are arranged in the second direction. In the example illustrated in FIG. 12B, the positive-electrode module external terminal 50P and the negative-electrode module external terminal 50N are provided at the other end in the second direction of the housing 20 of the battery pack 100E, and are arranged in the second direction.

Figure 12A:
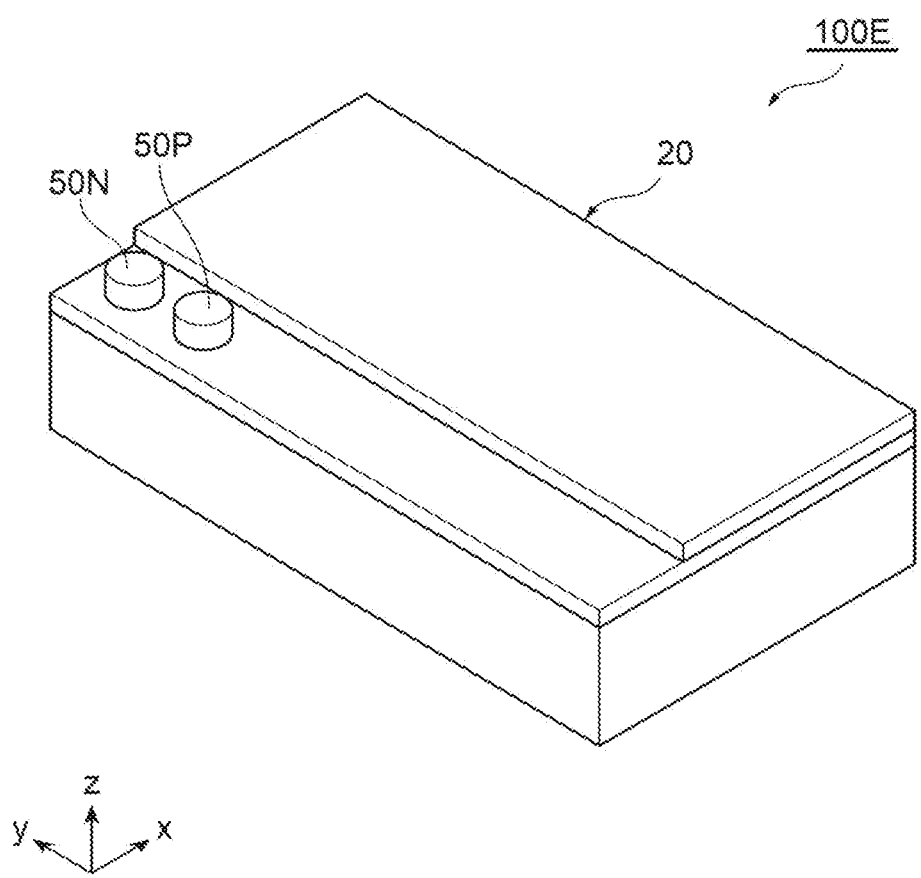
FIG. 12A is a schematic perspective view illustrating an example of a battery pack according to a sixth embodiment of the present invention.
Figure 12B:
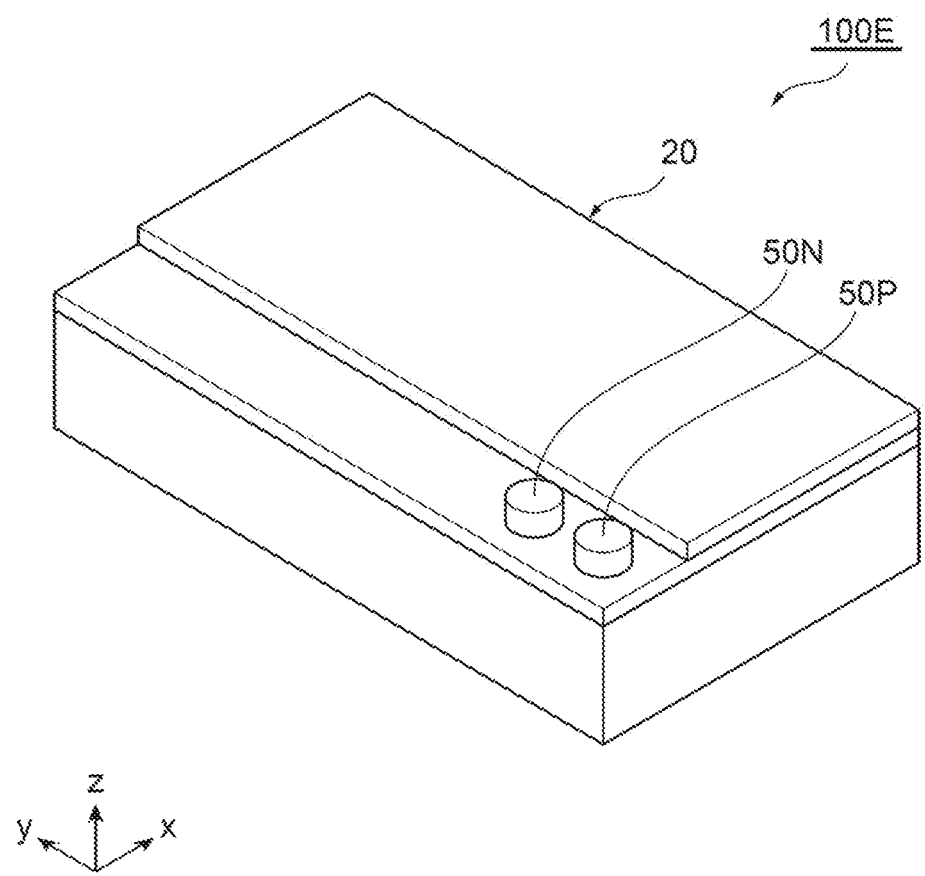
FIG. 12B is a schematic perspective view illustrating an example of the battery pack according to the sixth embodiment of the present invention.
Figure 12C:
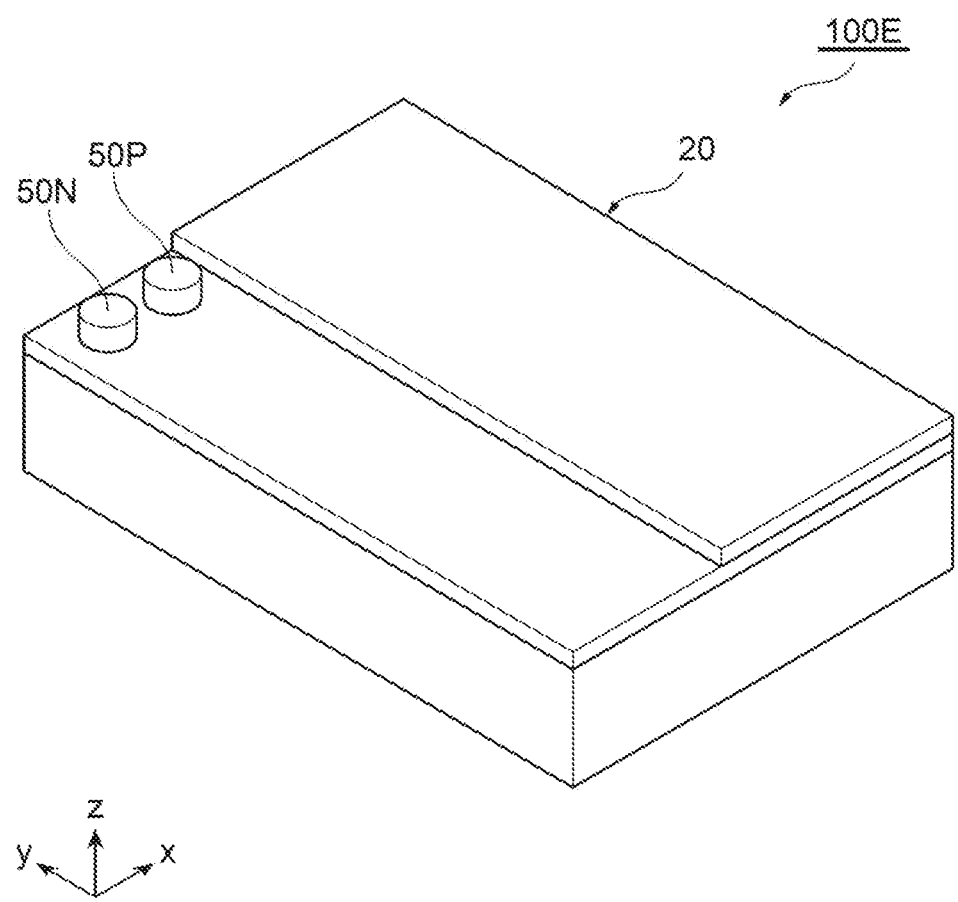
FIG. 12C is a schematic perspective view illustrating an example of the battery pack according to the sixth embodiment of the present invention.
Figure 12D:
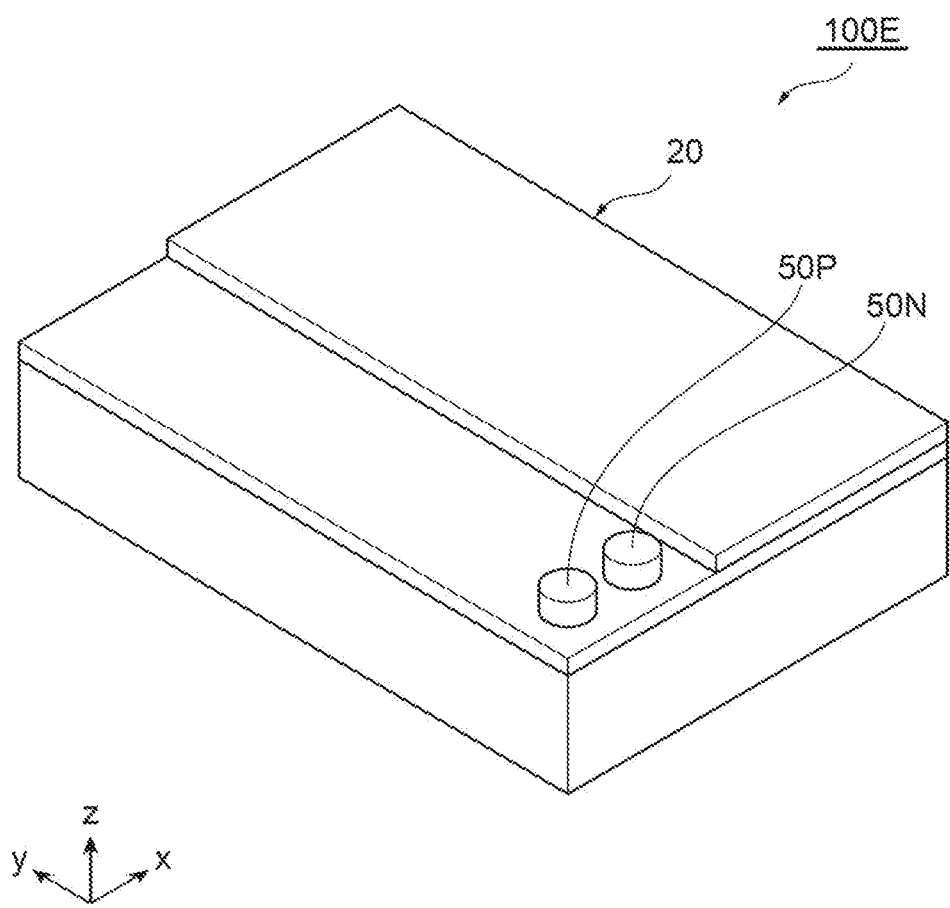
FIG. 12D is a schematic perspective view illustrating an example of the battery pack according to the sixth embodiment of the present invention.

In the example illustrated in FIG. 12C, the positive-electrode module external terminal 50P and the negative-electrode module external terminal 50N are provided at one end in the second direction (y-direction) of the housing 20 of the battery pack 100E, and are arranged in the first direction (x-direction), i.e., the shorter direction of the housing 20. In the example illustrated in FIG. 12D, the positive-electrode module external terminal 50P and the negative-electrode module external terminal 50N are provided at the other end in the second direction of the housing 20 of the battery pack 100E, and are arranged in the first direction.

Thus, in the battery pack 100E of the present embodiment, the positive-electrode module external terminal 50P and the negative-electrode module external terminal 50N are provided adjacent to each other at one end in the second direction (y-direction), i.e., the longer direction of the housing 20. Accordingly, compared to the case in which the positive-electrode module external terminal 50P and the negative-electrode module external terminal 50N of the battery pack 100E are spaced apart from each other, it is possible to easily connect a DC/DC converter, an inverter or the like to the positive-electrode module external terminal 50P and the negative-electrode module external terminal 50N.

Seventh Embodiment

Figure 13A:
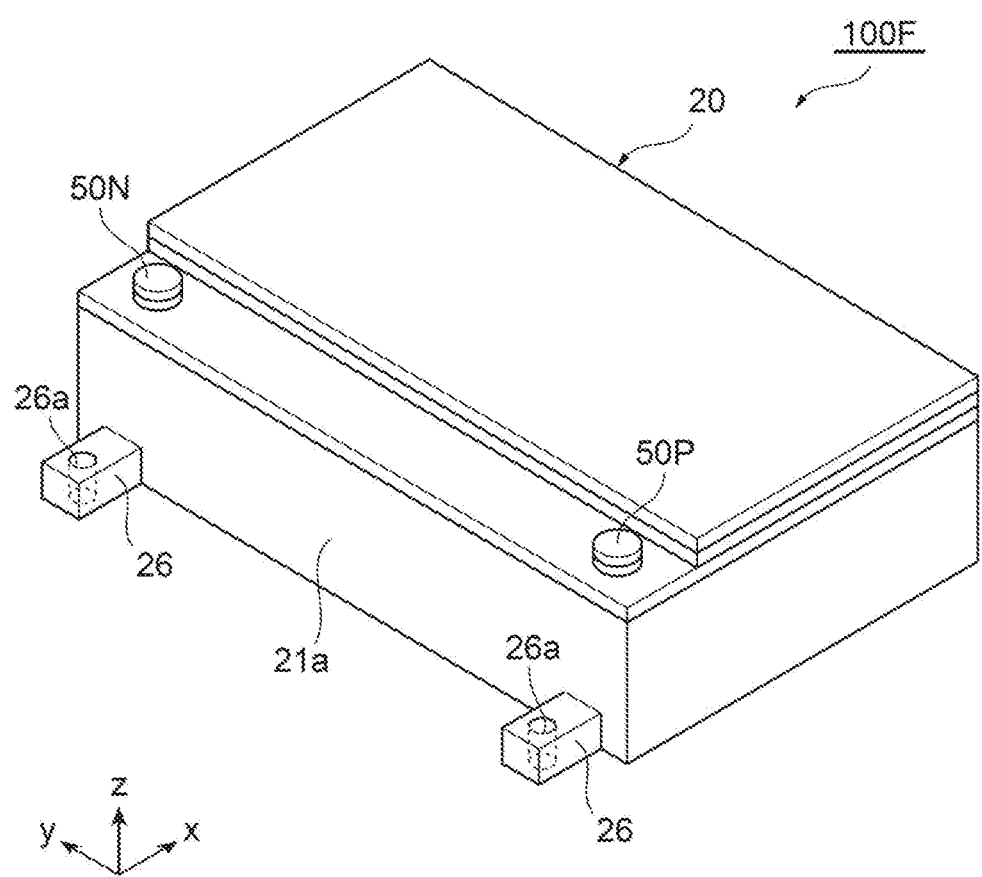
FIG. 13A is a schematic perspective view illustrating an example of a battery pack according to a seventh embodiment of the present invention.
Figure 13B:
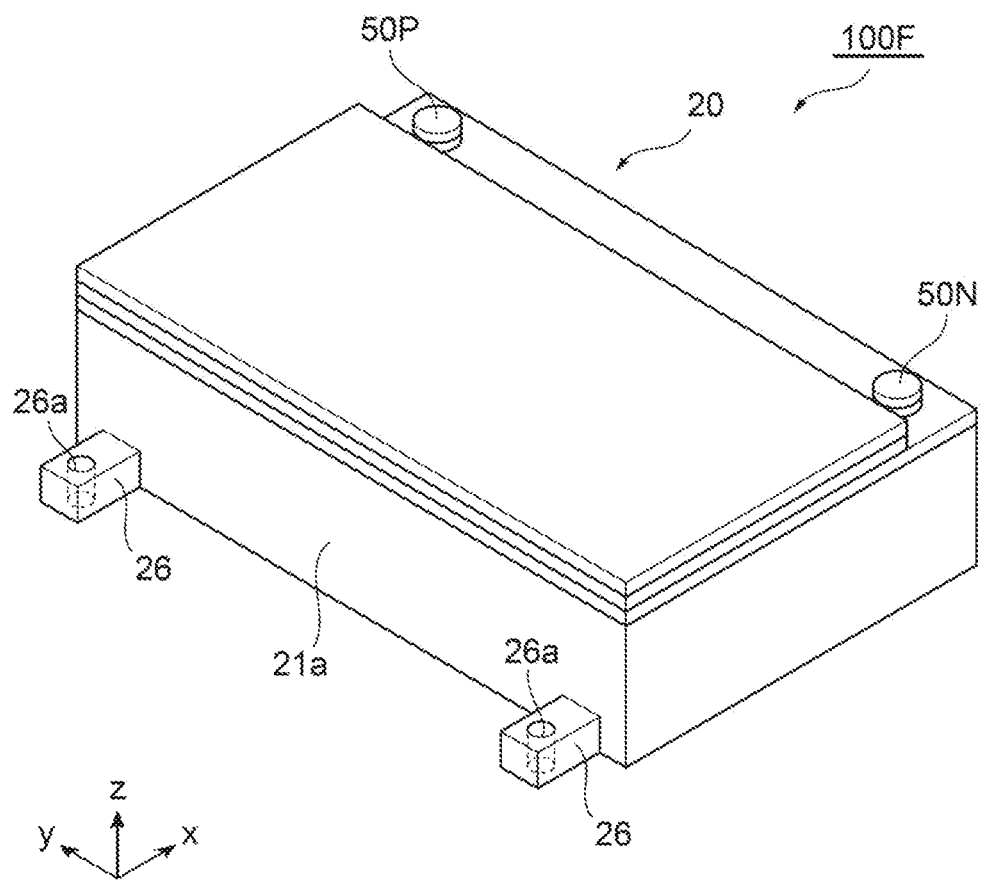
FIG. 13B is a schematic perspective view illustrating an example of the battery pack according to the seventh embodiment of the present invention.

With reference to FIG. 13A and FIG. 13B as well as FIG. 1 and FIG. 2, a battery pack 100F according to a seventh embodiment of the present invention will be described. FIG. 13A and FIG. 13B are schematic perspective views illustrating an example of the battery pack 100F according to the seventh embodiment of the present invention, as viewed from opposite directions. In FIG. 13A and FIG. 13B, illustration of portions other than the housing 20 of the battery pack 100F and the module external terminals 50P, 50N is omitted. The battery pack 100F of the present embodiment differs from the battery pack 100 of the first embodiment mainly in the configuration of the housing 20. The battery pack 100F of the present embodiment is similar to the battery pack 100 of the first embodiment in other respects. Accordingly, similar portions are designated with similar reference signs, and their description will be omitted.

In the battery pack 100F of the present embodiment, the housing 20 has, at both ends thereof in the second direction (y-direction), i.e., the longer direction, fixing portions 26 to be fixed onto an external mechanism. The fixing portions 26, for example, are brackets provided on the housing 20, the brackets protruding in the first direction from the sidewalls 21a, 21a in the first direction (x-direction), i.e., the shorter direction of the housing 20. The fixing portions 26 include, for example, bolt holes 26a. The battery pack 100F is fixed onto an external mechanism such as a vehicle, by, for example, having bolts screwed into or passed through the bolt holes 26a of the fixing portions 26 screw into screw holes or nuts of the external mechanism to which the battery pack 100F is to be attached. The fixing portions 26 may be provided at both sides in the first direction, i.e., the shorter direction, of the housing 20.

Thus, in the battery pack 100F of the present embodiment, the housing 20 has, at both ends thereof in the second direction (y-direction), i.e., the longer direction, the fixing portions 26 to be fixed onto the external mechanism. Accordingly, even if the battery pack 100F is subjected to vibrations or shock, it is possible to have the battery pack 100F stably fixed in place by the fixing portions 26.

While the embodiments of the present invention have been described with reference to the drawings, it will be understood that specific configurations are not limited to the embodiments, and that any design modifications and the like without departing from the scope of the present invention are included in the present invention.

REFERENCE SIGNS LIST

1 Battery cell
10, 10B Battery group
11 Battery column
20 Housing
21 Sidewall
23 Handle
26 Fixing portion
41 Substrate
42 Relay
43 Fuse
50N Module external terminal
50P Module external terminal
100, 100A-100F Battery pack
100a Support surface
C1 Center position of battery group
C2 Center position of housing
L Length (dimension in second direction)
W Width (dimension in first direction)
x First direction
y Second direction
z Height direction

The invention claimed is:
1. A battery pack comprising:
a battery group having
a plurality of battery cells, and
a center position of the battery group; and
a housing accommodating the battery group, the housing having a first sidewall in the first direction,
a second sidewall opposite the first sidewall in the first direction, and
a center position of the housing,
wherein the housing, with respect to a first direction and a second direction perpendicular to a height direction of the housing and to each other, has a dimension in the first direction which is smaller than a dimension in the second direction,
wherein the battery group is eccentrically located on a first sidewall side in the first direction in the housing, and
wherein a center of gravity of the battery pack is positioned on the first sidewall side between the center position of the battery group and the center position of the housing in the first direction.

2. The battery pack according to claim 1, further comprising a module external terminal connected to the plurality of battery cells of the battery group,
wherein the module external terminal is disposed on a second sidewall side opposite to the first sidewall side on which the battery group is eccentrically located in the first direction of the housing.

3. The battery pack according to claim 1, wherein the battery group is in contact with the first sidewall of the housing.

4. The battery pack according to claim 1, wherein the battery group has a dimension in the first direction which is smaller than a dimension in the second direction.

5. The battery pack according to claim 1, wherein:
the battery group has a configuration in which a plurality of flat and rectangular battery cells are stacked in a thickness direction of the battery group; and
the battery cells are stacked in a direction corresponding to the height direction.

6. The battery pack according to claim 1, wherein:
the battery group has a configuration in which a plurality of flat and rectangular battery cells are stacked in a thickness direction of the battery group; and
the battery cells are stacked in a direction corresponding to the first direction.

7. The battery pack according to claim 5, wherein:
the battery group has a plurality of battery columns in which the plurality of battery cells are stacked; and
the plurality of battery columns are arranged in the second direction.

8. The battery pack according to claim 1, wherein:
the battery group has a configuration in which a plurality of flat and rectangular battery cells are stacked in a thickness direction of the battery group; and
the battery cells are stacked in a direction corresponding to the second direction.

9. The battery pack according to claim 1, wherein the housing includes handles at both ends in the second direction.

10. The battery pack according to claim 9, wherein the handles are provided between a center position of the housing and a center position of the battery group in the first direction.

11. The battery pack according to claim 2, the module external terminal comprising:
a module external terminal for a positive electrode, and
a module external terminal for a negative electrode,
wherein the module external terminal for the positive electrode and the module external terminal for the negative electrode are disposed on the second sidewall side and provided adjacent to each other at one end in the second direction.

12. The battery pack according to claim 1, wherein the housing has, at both ends thereof in the second direction, fixing portions for being fixed onto an external mechanism.

13. The battery pack according to claim 1, further comprising a substrate, a relay, and a fuse which are accommodated in the housing,
wherein the substrate, the relay, and the fuse are disposed on a second sidewall side opposite to the first sidewall side in the first direction on which the battery group is eccentrically located in the housing.

14. The battery pack according to claim 1, wherein:
the housing has a support surface to be supported from below by an external mechanism in a state in which the housing is attached to the external mechanism; and
the support surface is parallel to the first direction and the second direction.

15. The battery pack according to claim 1, further comprising a battery module including the battery group,
wherein the battery module has a dimension in the first direction which is smaller than a dimension in the second direction, is positioned symmetrically about a center line of the battery pack extending in the first direction, and is eccentrically located on the first sidewall side in the first direction in the housing.

* * * * *